US 6,631,799 B2

(12) United States Patent
Samson (10) Patent No.: US 6,631,799 B2
(45) Date of Patent: Oct. 14, 2003

(54) VIBRATORY FEEDING SYSTEM (75) Inventor: Bruce L. Samson, Wyndmoor, PA (US)

(73) Assignee: Moore Push-Pin Company, Wyndmoor, PA (US)

(*) Notice: Subject to any disclaimer, the term of this patent is extended or adjusted under 35 U.S.C. 154(b) by 31 days.

(21) Appl. No.: 09/858,648

(22) Filed: May 16, 2001

(65) Prior Publication Data
US 2002/0175051 A1 Nov. 28, 2002

(51) Int. Cl.[7] .............................................. B65G 27/00
(52) U.S. Cl. ........................ 198/771; 198/758; 198/443
(58) Field of Search ................................ 198/443, 445, 198/446, 533, 535, 771, 758

(56) References Cited

U.S. PATENT DOCUMENTS

| | | | |
|---|---|---|---|
| 2,059,398 A | 11/1936 | Roemer et al. | 235/98 |
| 2,157,709 A | 5/1939 | Kiessling et al. | 153/1 |
| 2,608,289 A * | 8/1952 | Holzworth | 198/758 |
| 2,832,458 A | 4/1958 | Ferguson et al. | 198/33 |
| 3,139,713 A | 7/1964 | Merrill et al. | 53/55 |
| 3,305,067 A | 2/1967 | Mayer | 198/30 |
| 3,338,385 A | 8/1967 | Sage | 198/220 |
| 3,386,618 A | 6/1968 | Gilbert | 221/12 |
| 3,450,249 A | 6/1969 | Poll | 198/40 |
| 3,524,533 A | 8/1970 | Miller et al. | 198/220 |
| 3,578,094 A * | 5/1971 | Henry et al. | 198/443 X |
| 3,618,819 A | 11/1971 | Blackburn | 221/2 |
| 3,628,648 A * | 12/1971 | McClusky | 198/443 X |
| 3,650,367 A | 3/1972 | Mead | 198/33 |
| 3,746,211 A | 7/1973 | Burgess, Jr. | 221/200 |
| 3,772,971 A | 11/1973 | Dutro et al. | 93/93 |
| 3,794,087 A | 2/1974 | Sano et al. | 141/131 |
| 3,817,370 A | 6/1974 | Cox | 198/220 |
| 3,837,139 A | 9/1974 | Roseberg | 53/59 |
| 3,841,471 A | 10/1974 | Mead | 198/289 |
| 3,842,573 A | 10/1974 | Price | 53/55 |
| 3,882,993 A | 5/1975 | Mead | 198/26 |
| 3,964,601 A | 6/1976 | Armstrong | 198/220 |
| 4,013,192 A | 3/1977 | Pillon | 221/7 |
| 4,161,677 A | 7/1979 | Dill | 318/482 |
| 4,180,153 A | 12/1979 | Krishnan et al. | 198/425 |
| 4,262,793 A | 4/1981 | Hebenstreit et al. | 198/424 |
| 4,628,520 A | 12/1986 | Menger | 377/6 |

(List continued on next page.)

OTHER PUBLICATIONS

Speed Count, "The solution to multiple counting and batching tasks," *The Speedcount™ System*, 1998, SCB–MCS 10/98, 4 pages.

Bimba Manufacturing Company, http://www.bimba.com/about/aboutbimmain.htm, 1999, 4 pages.

Norgren Pneumatics, "Making e–pneumatics easier," http://www.norgren.com/default.asp, 1999, 7 pages.

Nugget 70 Series Valves, *Norgren*, Section 4, VAL–4–1–VAL–4–13.

Syntron Bulletin 420973, "Syntron vibratory parts feeders VM series; Dual horizontal drive magnets, high energy output," 1973, 5 pages.

*Primary Examiner*—James R. Bidwell
(74) *Attorney, Agent, or Firm*—Woodcock Washburn LLP (57) ABSTRACT A vibratory feeding system includes a hopper, a tray and a vibrator. The hopper is disposed above the tray so that components can flow from the hopper to the tray. The vibrator is mounted to the tray, so that the tray can be vibrated to move components along the tray. The tray can have a v-groove along which the plurality of components can flow. The tray can also have a plurality of sections that are separated by steps. The plurality of components flow down the steps as they move along the tray. The vibration, the v-groove and the steps cause the components to be singulated as they flow along the tray. A plurality of shedders can be mounted to the tray to create a path through which the components flow. The shedders can regulate the flow of components from the hopper and/or assist in singulating the components.

34 Claims, 8 Drawing Sheets

U.S. PATENT DOCUMENTS

| | | |
|---|---|---|
| 4,635,215 A | 1/1987 | Friend ......................... 364/555 |
| 4,644,838 A | 2/1987 | Samson et al. ............... 83/865 |
| 4,674,259 A | 6/1987 | Hills ........................... 53/202 |
| 4,677,283 A | 6/1987 | Lewis ......................... 235/98 |
| 4,707,843 A | 11/1987 | McDonald et al. ............ 377/8 |
| 4,982,412 A | 1/1991 | Gross .......................... 377/6 |
| 5,012,913 A | 5/1991 | Kramer ........................ 193/2 |
| 5,101,359 A | 3/1992 | Gross .......................... 364/479 |
| 5,114,039 A | 5/1992 | Walshe et al. .............. 221/171 |
| 5,313,508 A | 5/1994 | Ditman et al. ................. 377/6 |
| 5,463,839 A | 11/1995 | Stange et al. .................. 53/54 |
| 5,671,787 A | 9/1997 | Wehrmann ................. 141/134 |
| 5,873,326 A | 2/1999 | Davet et al. ................ 119/245 |

* cited by examiner

FIG. 11

VIBRATORY FEEDING SYSTEM

FIELD OF THE INVENTION

The inventions described herein relate to vibratory feeding systems for feeding components and methods of feeding components with a vibratory feeding system.

BACKGROUND OF THE INVENTION

In a typical manufacturing process, components are mass produced, sorted and counted. In order to count the components a counting device typically has to receive the components one at a time. During manufacturing and packaging, other types of devices also need to receive components one at a time. Typically, however, when components are mass produced, they are not singulated. Thus, there is a need for feed systems that singulate components and feed the singulated components one at a time to a counter or other applicable device. Examples of components that need to be fed and singulated include but are not limited to fasteners and hooks. Although vibration feed systems have been developed, the inventions disclosed herein relate to an improved vibration feed system and improved methods of feeding components with a vibration system.

Due to the size, shape and geometry of certain components, they tend to become tangled when grouped together. For instance, hooks have a tendency to become tangled. One of the difficulties encountered in feeding these types of components is untangling them as they are being fed. Certain aspects, but not all aspects, of the inventions disclosed herein are directed towards singulating these types of components.

SUMMARY OF THE INVENTION

According to one aspect of the inventions disclosed herein, a vibratory feeding system for feeding a plurality of components includes a tray for receiving a plurality of components and a vibrator for vibrating the tray. The tray preferably comprises a first section and a second section mounted to the first section so that there is a step between the first section. Both the first and the second section are preferably disposed at an incline so that the plurality of components flow down the inclined section and down the step as the tray is vibrated. The vibrator is coupled to the tray and provides the impetus to vibrate the first and second tray sections so that the plurality of components flow from the first section down the step and along the inclined second tray section. As the components flow along the tray, they become singulated. From the tray the components can flow to another device such as a counting machine. The step and the vibration forces assist in singulating the components. The components can be any of a variety of components including but not limited to fasteners, hooks and pharmaceutical products.

The system may also include a hopper mounted above the tray. The hopper can be filled with components, so that the components to be fed flow from the hopper to the tray. Preferably, the hopper is funnel shaped and disposed above the first tray section. A gate may be mounted to the hopper that controls the flow of components from the hopper to the tray. Preferably, the gate is adjustable so that the size and shape of the opening defined by the gate can be varied based upon the components size, shape and geometry.

The tray sections preferably include a v-groove in which the components flow as they move down the tray sections. The shape of the v assists in singulating the components as the components move along the tray.

The tray may include a third tray section that is mounted as a cantilever, as compared to the first two tray sections which are supported. Because the third tray section is mounted as a cantilever, its vibration characteristics will differ from those of the first two tray sections. This assists in singulating the components.

Mounted to the tray may be a plurality of relatively rigid shedders. The shedders disrupt the flow of components along the tray and create a tortuous path through which the components must flow. This assists in singulating the components. The shedders can also assist in regulating the flow of components from the hopper to the tray. If the flow of components exiting the hopper is too fast, the flow of components through the shedder path will be slow, causing a back pressure. This back pressure limits the flow of components from the hopper. Likewise, if the flow of components through the shedders is relatively fast, more components will flow from the hopper to the tray and to the shedders.

The shedders can be adjustably mounted to the tray so that the path defined by the shedders can be optimized based upon the size, shape and geometry of the components to be fed. For example, the shedders can be rotatably mounted so that the angle at which they are disposed relative to the path of the components can be changed. Alternatively or additionally, the shedders can be mounted to adjust the extent to which they extend across the tray.

Other aspects of the inventions are discussed below.

DETAILED DESCRIPTION OF PREFERRED EMBODIMENTS

Figure 1:
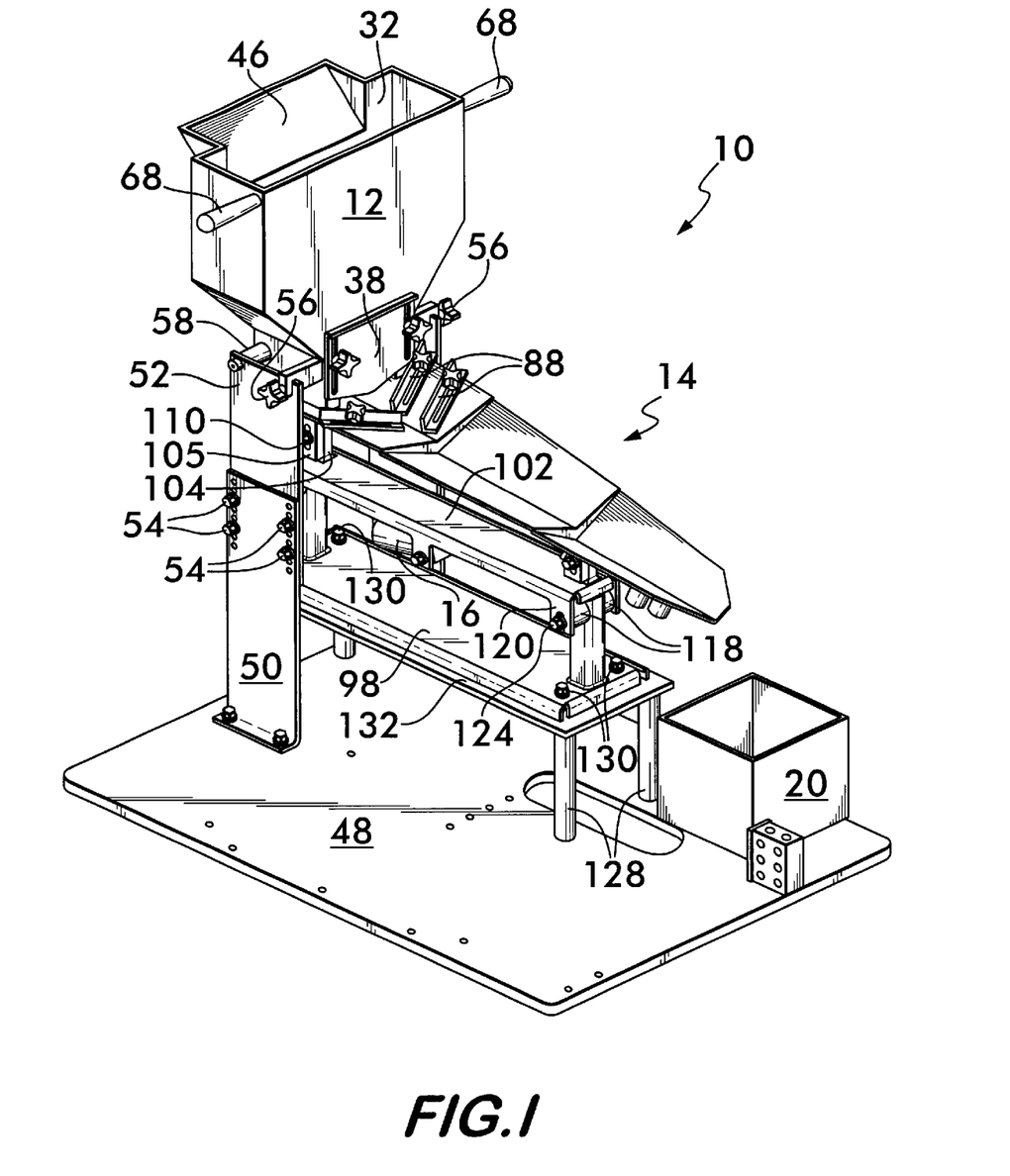
FIG. 1 is a perspective view of a vibratory feeding system according to a preferred embodiment of this invention.
Figure 2:
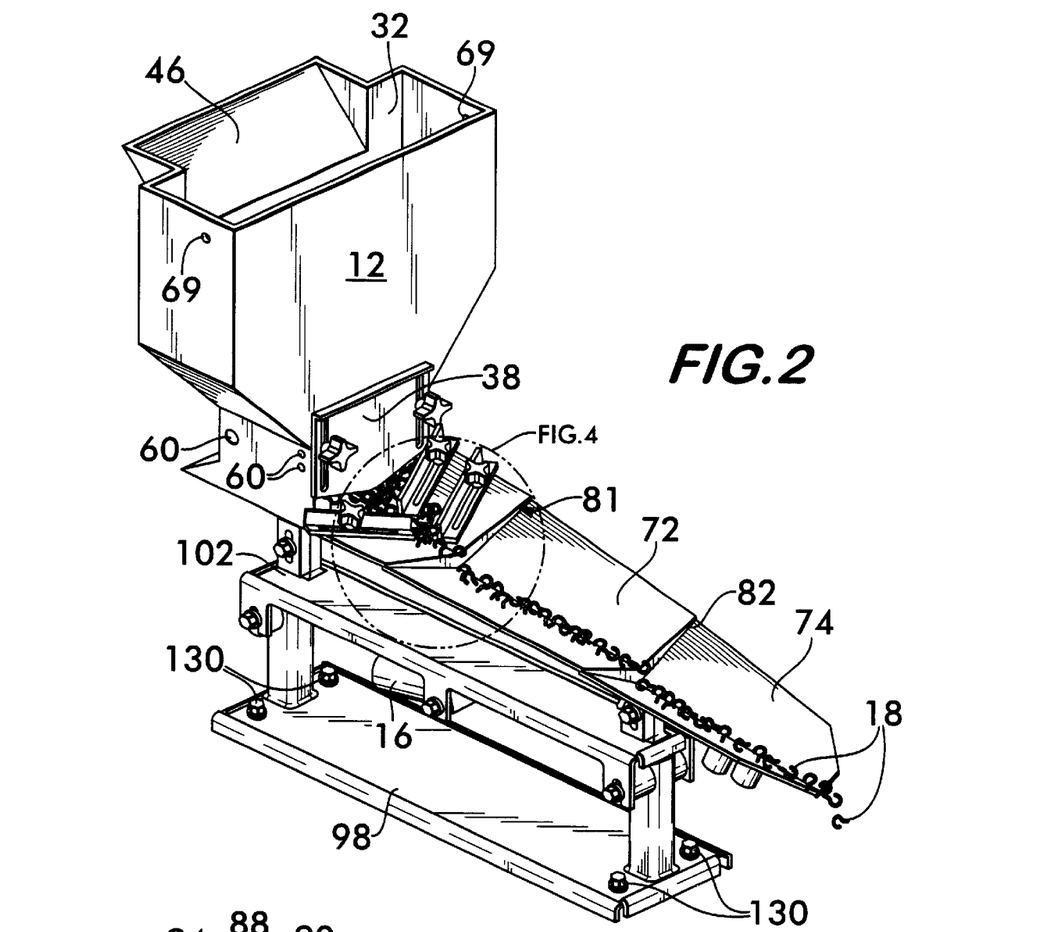
FIG. 2 is a perspective view of a preferred embodiment of a portion of the vibratory feeding system of FIG. 1.

FIG. 1 depicts a vibratory feeding system or parts singulator 10 according to a preferred embodiment of this invention. As shown, the feeding system 10 includes a hopper 12, a tray 14 or singulation channel and a vibrator 16. The hopper 12 is mounted above the tray 14 so that components 18 can be placed into the hopper 12 and then fed by gravity to the tray 14. The tray 14 is mounted at an incline so that components from the hopper 12 can flow down the incline until they flow off of the tray 14. Mounted to the both the hopper 12 and the tray 14 is the vibrator 16. The vibrator 16 vibrates the hopper 12 and the tray 14, so that components flow from the hopper 12 to the tray 14 and along the tray 14, as shown in FIG. 2. As the components 18 flow along the tray 14, the components 18 are sorted into a single file or in-line arrangement so that they flow off of the tray 14 one at a time. The components 18 flowing from the tray 14 can flow to any suitable device 20. For example, the device 20 could be a counter.

The term components 18 is not meant to be limiting and is used generically to refer to any structure that can be sorted into a single file arrangement. Examples of components 18 that could be fed with the system 10 are fasteners, washers, tacks, hooks, medical devices and pharmaceuticals. The components could be a finished product or a part for use in another structure. These examples are meant to be illustrative and are not provided as a limitation.

There are many features of the system that cause the components to be singulated as they flow along the tray 14. These features which are elaborated upon below include the stepped inclined construction of the tray 14, the vibration, the tray shedders 88, the grooved tray construction and the cantilevered tray section.

The First Preferred Embodiment of the Hopper

Figure 3:
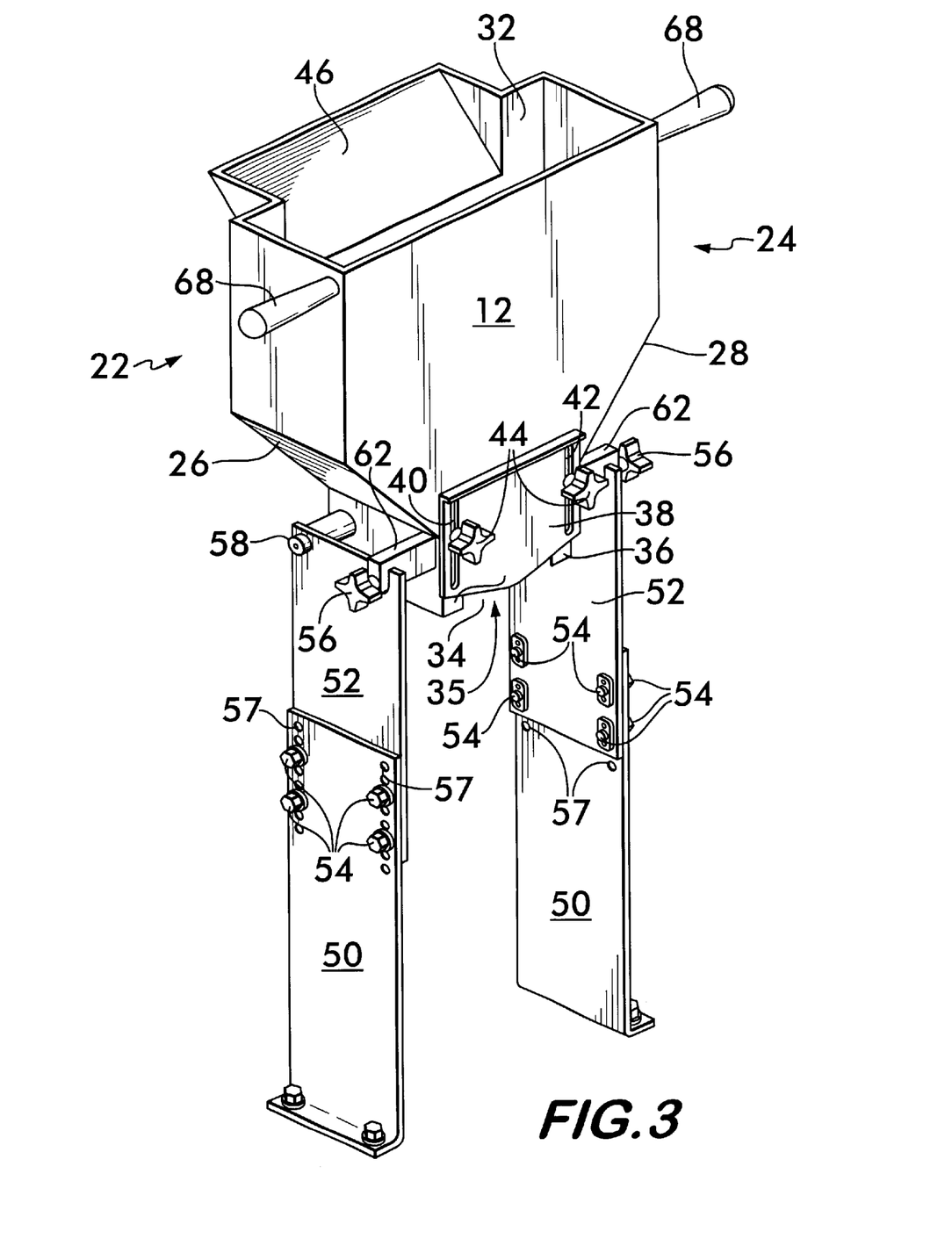
FIG. 3 is a perspective view of a preferred embodiment of the hopper of FIG. 1.

FIG. 3 depicts a perspective view of the hopper 12 of the feed system 10 shown in FIG. 1. As shown, the hopper 12 is generally funneled shaped so that components can be placed into the hopper 12 and funneled to the bottom of the hopper 12. In the embodiment depicted, side walls 22 and 24 have at least a portion 26, 28 of which are angled to create a funneled effect. Although the front 30 and back 32 walls are depicted vertically, it will be appreciated that they could be angled similar to or in lieu of the angled side walls 26,28 to further create a funnel effect. It is generally preferable that the hopper 12 has a funneled shape and the walls of hopper can be oriented in a variety of ways to create a funneled hopper 12. Although it is preferable that the hopper 12 is funneled, the hopper 12 need not be funneled.

The hopper 12 may have a bottom portion 34 which is generally rectangular. As best understood with reference to FIG. 3, at least a portion of one side of the bottom portion 34 may have an opening 35. In the preferred embodiment shown, the walls 36 define the opening 35 and have cavities which are not shown, but it will be understood that the cavities are disposed beneath the slots in the gate 38, which are described below, so that the gate 38 can be mounted to the hopper 12.

A gate 38 may mounted to the hopper 12 and preferably to the bottom portion 34. The gate 38 can be fixed or adjustable as shown in the preferred embodiment of FIGS. 1–3. As shown, the gate 38 may have slots 40, 42 which align with cavities (not shown) in the walls 36 of the hopper 12. Mechanical fasteners 44, such as bolts with finger knobs, can be inserted through the slots 40, 42 of the gate 36 and the cavities of the hopper 12. Fasteners 44 can be tightened to nuts (not shown) on the other side of the slots 36 of the hopper 12 in order to securely mount the gate 38 to the hopper 12. The height of the gate 38 above the tray 14 can be adjusted, as best understood with reference to FIG. 3, by sliding the gate 38 upward or downward and thereby moving the slots 42 relative to the fasteners 44 and tightening the fasteners 44 at the desired location. The fasteners 44 may have finger knobs in order to make adjustment easier.

As described in more detail below, the height of the gate 38 above the tray 14 helps to regulate the flow of components 18 from the hopper 12 to the tray 14. The height of the gate 38 may be adjusted based in part on the size, shape and geometry of the components and the desired feed rate. It will be appreciated that the gate 38 can be mounted to the hopper 12 with any suitable means, and the mounting of the gate 38 described herein is provided by way of example.

The hopper 12 is preferably opened at its top so that components 18 can be placed into the hopper 12 by either a batch process or a continuous feed system. Further, the back wall 32 of the hopper 12 has at least a portion 46 of which is angled to facilitate the flow of components 18 into the hopper 12. Although not shown, the hopper 12 can have a door disposed in its back 32, so that components can be easily removed from the hopper 12.

In the preferred embodiment shown, the hopper 12 has an open bottom. Although not shown, the hopper 12 could have a closed bottom. Some components are more easily fed with a closed bottom hopper 12. It will be appreciated that if a closed bottom hopper 12 is used, a vibrator (not shown although similar to the vibrator 16 described below) could be mounted to the hopper 12 to cause components to flow from the closed bottom hopper to the tray.

The hopper 12 is mounted to the support plate 48 shown in FIG. 1 by any suitable means. In the preferred embodiment, brackets 50, 52, fasteners 54, clamping fasteners 56 and pivot fasteners 58 are used to mount the hopper 12. Brackets 50 can be, as shown in FIGS. 1 and 3, L-shaped brackets, and they can be mounted to the support plate 48 by fasteners 54, as shown in FIG. 1. Although only one side of the hopper 12 mounting is shown in FIG. 1 is depicted, it will be appreciated that the opposing side of the hopper 12 is similarly mounted. Brackets 52 may be each mounted to one of the brackets 50 by fasteners 54. As shown in FIG. 3, brackets 52 may have a plurality of holes 57 (some of which are labeled in FIG. 3) so that the height of the brackets 52 relative to brackets 50 can be adjusted. Mounting of the height of the bracket 52 relative to the bracket 52, as will be appreciated, adjusts the height of the hopper 12 relative to the tray 14. It will be appreciated that the brackets and the way they are mounted are one way of mounting the hopper 12, and that numerous other ways can be used to mount the hopper 12.

The hopper 12 can be mounted to the brackets 52 with clamping fasteners 56 and pivot fasteners 58. As best shown in FIG. 2, the hopper 12 has a plurality of holes 60. In the preferred embodiment, the holes 60 are disposed in the bottom portion 34 of the hopper 12. Bracket 52 may have a hole which corresponds to the hole 60 in the hopper 12, and a groove 62. Clamping fasteners 56 can fit into grooves 62 so that the clamping fasteners 56 can be slid over the top of the brackets 52. The clamping fasteners 56 also have a portion which can also fit into some of the holes 60 of the hopper. By tightening the clamping fasteners 56, the clamping fasteners are inserted into the holes 60 and are clamped to the bracket 52. This attaches the hopper 12 to the bracket 52. In the preferred embodiment, the clamping fasteners 56 have finger knobs for easy adjustment.

Pivot fasteners 58 can be inserted through corresponding holes in brackets 52 and a corresponding hole 60 in the hopper 12. Again, although only one side of the hopper 12 is fully shown in FIGS. 1–3, it will be appreciated that the opposing side of the hopper 12 is similarly mounted. In order to quickly dump the hopper 12, the clamping fasteners 56 can be loosened and the hopper 12 can be pivoted about pivot fasteners 58 until the hopper 12 is inverted. Although the hopper 12 is pivotably mounted for quick dumping, it will appreciated that the hopper 12 could be mounted in numerous other ways including but not limited to with various mechanical fasteners. Moreover, the hopper 12 need not be pivotably mounted.

Rubber mounts can be used when employing fasteners in order to provide damping or vibration isolation. It will be appreciated that the hopper 12 can be mounted to the support plate with a variety of mounting techniques. The specific use of brackets and fasteners is provided by way of example.

Extending form the hopper 12 may be handles 68. Handles 68 may be attached to the openings 69 of the hopper 12 through any suitable means, such as threads, or integrally formed with the hopper 12. The handles 68 are generally used when handling the hopper 12 in order to mount the hopper 12 at the desired height and when pivoting the hopper 12 about the pivot fasteners 58.

In the embodiment shown, the hopper 12 is not directly connected to the vibrator 16. The plurality of components 18 on the tray 14 will vibrate because the tray 14 is coupled to the vibrator 16. When the plurality of components flow from the hopper 12 to the tray 14 and there is a stream of components 18 from the tray 14 to the hopper 12, the components in the hopper 12 will vibrate because the vibrations will be transmitted from the components on the tray 14 to the components in the hopper 12.

The Preferred Embodiments of the Tray

Figure 4:
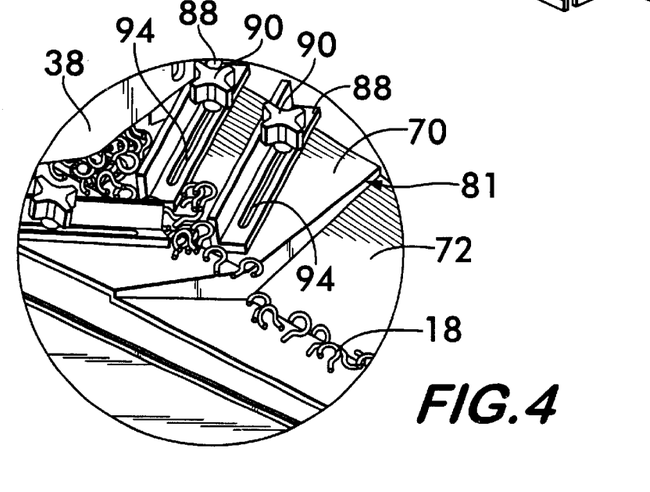
FIG. 4 is an exploded view of detail 4 of FIG. 2.
Figure 5:
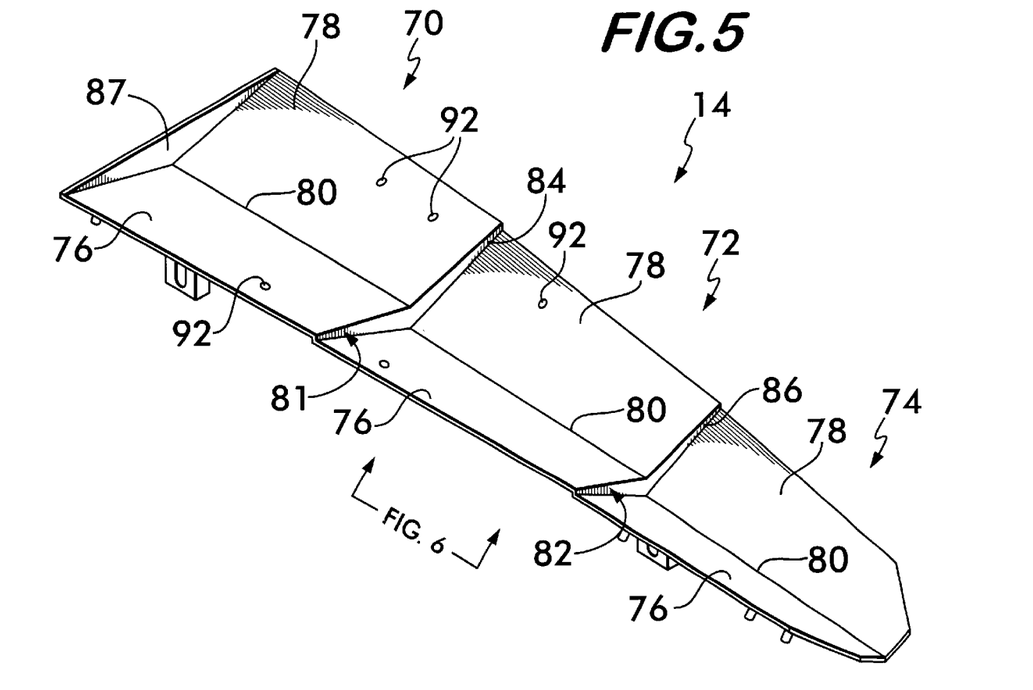
FIG. 5 is a perspective view of the top of a preferred embodiment of the tray of FIG. 1.
Figure 6:
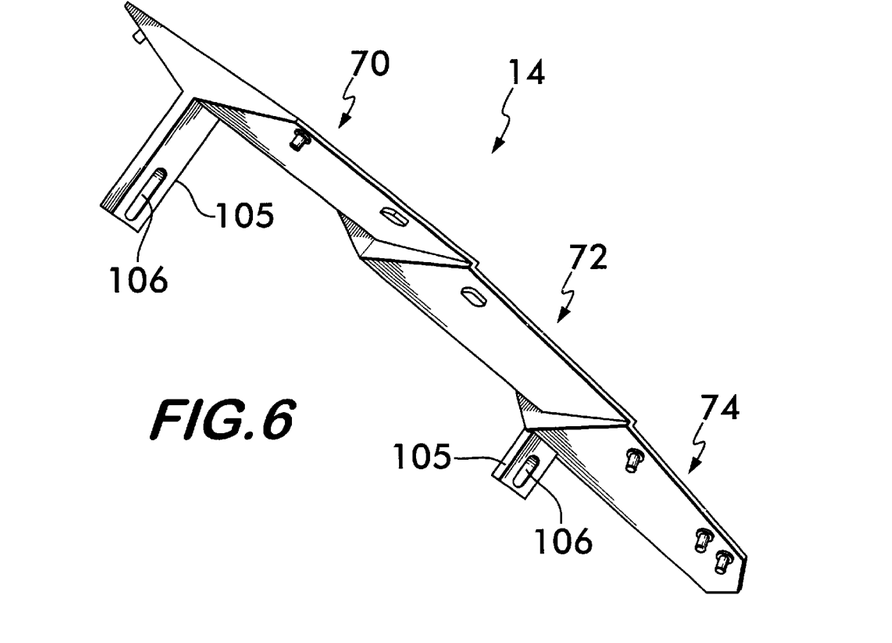
FIG. 6 is a perspective view of the underside of the tray of FIG. 4 as viewed along line 6—6 of FIG. 5.
Figure 7:
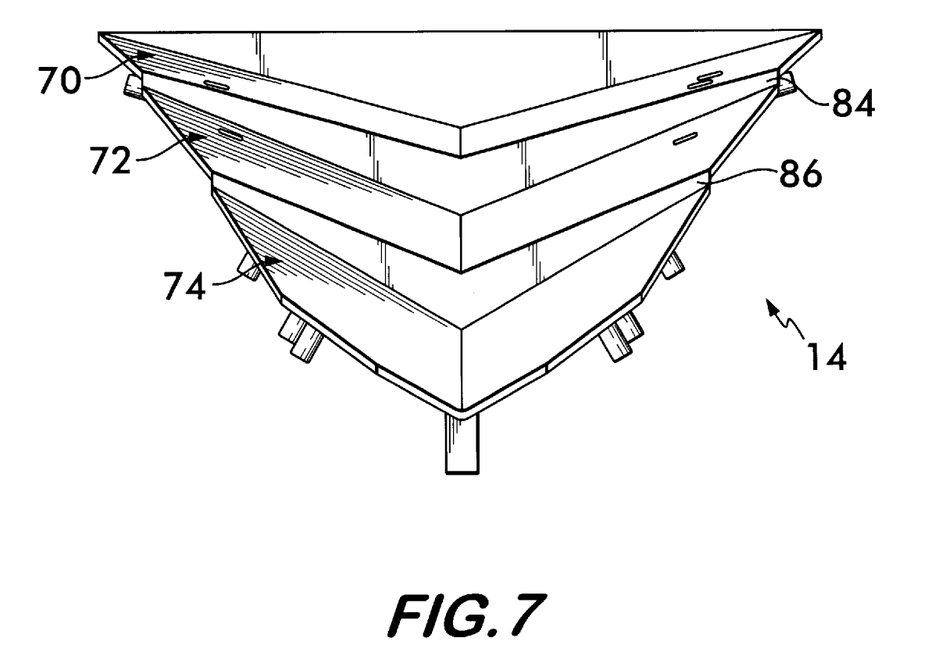
FIG. 7 is a front elevation view of the tray of FIG. 4.

As shown in FIGS. 1 and 2, the tray or singulation channel 14 is mounted beneath the hopper 12. Although the tray 14 is preferably stainless steel, the tray 14 may be formed from any suitable material including metals and non-metals. A preferred embodiment of the tray 14 is depicted in FIGS. 4–7. FIG. 5 is a perspective view of the tray 14, and FIG. 6 is a perspective view of the underside of the tray 14 of FIG. 4 as viewed along line 6—6 of FIG. 5. FIG. 7 is a front elevation view of the tray of FIG. 4. The tray as shown in FIGS. 3 and 4 may have a plurality of sections. In the embodiment shown, the tray 14 has three sections, first section 70, second section 72 and third section 74. The tray 14 can have a variety of such sections including depending on the component to be fed, one section, two sections or more than three sections.

As depicted in FIGS. 2 and 5, each of the tray sections 70, 72, 74 is preferably substantially v-shaped. The v-shape is defined in each of the sections 70, 72, 74 by two surfaces 76, 78 that oppose each other at an angle as shown in FIG. 5. The v-groove 80 defined by the sections can be adjusted by manufacturing the sections so that the angle of the v differs. The shape of the v-groove 80 can be manufactured to meet the demands for feeding a specific component. For example, a wider or narrower v may be used based on the shape, size and geometry of the components. Although the term v groove is used herein, the groove can have a radius or if desired and the term substantially v-groove is meant to include these types of grooves.

In a preferred embodiment, the v-shape varies between tray sections 70, 72, 74. The v-shape of the tray sections 70, 72, 74 is preferably flatter in the first section 70 and is progressively less flat or a deeper v in the second 72 and third sections, as best understood with reference to FIG. 7. By making the v-shaped progressively deeper, the components 18 are more easily singulating as they move along the tray 14 because they tend to become singulated in the v grooves.

Each section 70, 72, 74 is preferably disposed such that there is a step 81, 82 between sections, as best shown in FIGS. 5 and 7. By mounting each section so that the start of each section is a at a height that is lower than the end of the previous section, lips 84, 86 are formed. These lips 84, 86 create steps 81, 82 so that the components 18 drop in a waterfall manner from one tray section to another tray section, as best understood with reference to FIG. 4, which depicts components 18 traveling down the step 81 from the first tray section 70 to the second tray section 72. This assists in separating the components 18 into a single file arrangement as the components 18 tend to fall one at a time over the lips 84, 86 and into the v of the next section.

The first section 70 of the tray 14 preferably has a back 87. This back 87 prevents components 18 from flowing off of the back end of the tray 14.

Figure 10:
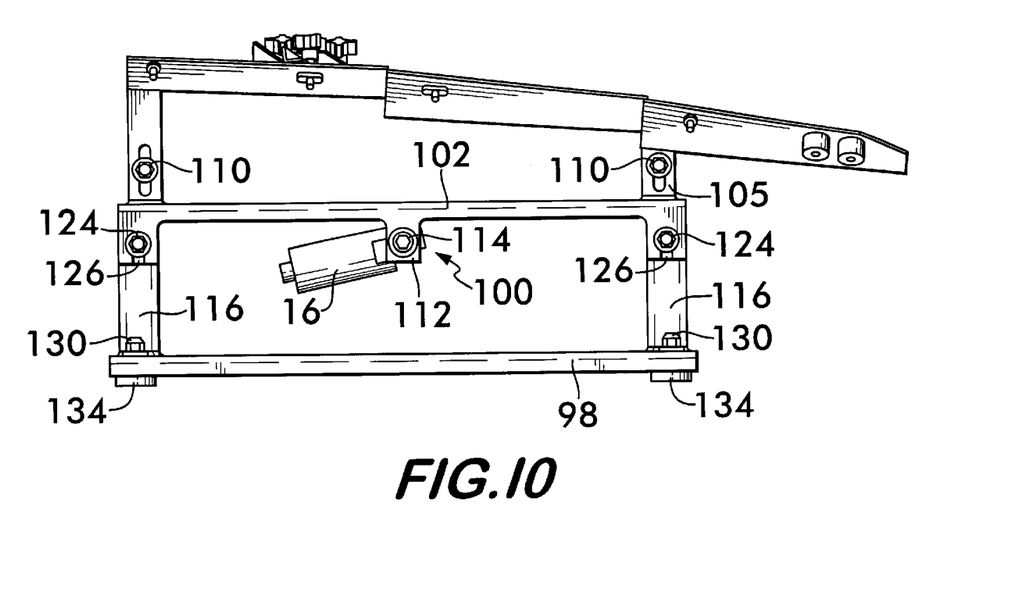
FIG. 10 is a side view of the tray and vibrator of FIG. 1.

As shown in FIGS. 1 and 10, the distal most section of the third section is unsupported and is a cantilever. Because of this, the vibration characteristics of the third section and particularly the unsupported portion differ from the vibration characteristics of the first two sections. Experimentation has determined that this difference in vibration characteristics between the sections causes some components (screws) to become separated easily and flow more easily in a single file manner.

Mounted to the tray 14 may be at least one shedder 88. In a preferred embodiment, the tray 14 has three shedders 88 which are shown in FIGS. 1, 2 and 4. Although the shedders 88 can be arranged in a variety of ways, they are in the preferred embodiment configured in a serpentine pattern as shown in FIGS. 1, 2 and 4. As will be best understood by reference to FIGS. 2 and 4, the shedders 88 regulate the flow of components 18 flowing from the hopper 12 to the tray 14 and separate components 18 so that they flow in more of a single file arrangement.

The shedders 88 help to regulate the flow of components 18 from the hopper 12 because if the components 18 flow too quickly from the hopper to the tray 14, the shedders 88 slow the flow of components 88. As the flow of components 18 through the shedders 88 slows, the components 18 to tend to back up and the flow of components 18 from the hopper 12 to the tray 14 slows. Conversely, if the flow through the shedders 88 is relatively quick, the back pressure will lessen, which will increase the flow of components 18 through the shedders 88. The shedders 88 also separate the components 18 as shown in FIGS. 2 and 4 so that the components 18 flow in more of a single file arrangement when exiting the shedders 88 as compared to when they enter the shedders 88.

The shedders 88 can take a variety of embodiments one of which is depicted. As shown, the shedders 88 are in this embodiment a bar, which is mounted to the tray 14 and preferably the first tray section 70. The bar 88 can be L-shaped as shown in FIG. 4, but this embodiment is illustrative. The shedders 88 can be mounted to the tray 14 in a variety of manners, one way of which is depicted. In the preferred embodiment, the shedders 88 are mounted with fasteners 90, openings 92 (which are shown in FIG. 5) and slots 94 (which are shown in FIG. 4). The fasteners 90 extend through the slots 94 in the shedder bars 88 as shown in FIG. 4 into the openings 92 in the tray 14. As shown the shedders 88 extend at an angle to the centerline of the tray 14, so that they create a relatively tortuous path through which the components 18 must flow.

Preferably, the shedders 88 are constructed from a relatively rigid material such as stainless steel or suitable polymer that does not bend when the components contact the shedders 88. Rather, the components contact the shedders 88 and bounce off of the shedders which tends to cause the components to separate and become singulated.

The fasteners 90 may have finger knobs for easy adjustment of the fasteners and shedders. The shedders 88 may be adjustably mounted so that the shedders 88 can be adjusted. In the preferred embodiment, the angle at which they are disposed with respect to the centerline of the tray 14 and the extent to which the shedders 88 extend laterally across the tray 14. This lateral adjustment can be accomplished by loosening the fastener and moving the respective shedder 88 inward or outward laterally, and the angle at which the shedders 88 are disposed can be adjusted by rotating the shedders 88. By adjusting the shedders 88, the path of components 18 can be changed. This is beneficial because the size, shape and geometry of the path created by the shedders 88 can be adjusted based on the size, shape and geometry of the components 18.

Although the shedders 88 are mounted to the first tray section 70 in the embodiment shown, it will be appreciated that the shedders 88 could be mounted to other tray sections or to multiple tray sections. For example and not by way of limitation, openings 92 in which a shedder 88 can be mounted are disposed in the second tray section as shown in FIG. 5. Moreover, the arrangement of the shedders 88 into a serpentine pattern can be varied as needed. The size and the shape of the components 18 to be sorted and fed will dictate the number, location and arrangement of the shedders 88.

This invention has been found to have benefits in feeding and singulating components which tend to become tangled when grouped together, including but not limited to the components 18 shown in FIGS. 2 and 4. These hooked end components 18 tend to become tangled with each other. The shedders 88 assist in singulating them because the components 18 contact the relatively rigid shedders 88 and bounce off of the shedders 88, which tends to cause the components 18 to separate. Additionally, as the components 18 flow through the serpentine path created by the shedders 88 they tend to become singulated. As the components 18 flow over the steps 81, 82 and align in the v-grooves they also tend to become singulated. The vibration further tends to singulate the components. Although all of these features assist in singulating and feeding such components, some or all of them may be employed depending upon the size, shape and geometry of the components 88.

The embodiment of the tray or singulation channel 14 depicted can be described as having a plurality of elongated, substantially v-shaped sections arranged in series and in cascade to define at least in part a serpentine path downwardly inclined from a receiving location to a discharge location. The receiving location being where the components are received from the hopper 12, and the discharge location being where the components are fed to another device 20. The term cascade refers to the stepped or waterfall arrangement of the tray sections 70, 72, 74.

The Preferred Embodiments of the Vibration System

A preferred embodiment of the vibrator 16 and the mounting of the vibrator in the feed system 10 is depicted in FIGS. 1, 2 and 8–10. The vibrator 16 vibrates the tray 14 which causes the components 18 to move along the tray from the hopper 12 to the opposing end of the tray 14. The vibration also causes the components 18 to separate as they move along the tray 14 in between the shedders 88, as they move down the steps 81, 82 and along the v-grooves of the trays. The vibrator 16 can have multiple embodiments and in a preferred embodiment the vibrator 16 is a linear vibrator and more particularly a pneumatic non-impacting linear vibrator which is distributed by Martin Engineering Michigan of Ivonia, Mich. The vibrator 16 can be pneumatic or electromagnetic and impacting or non-impacting.

Figure 8:
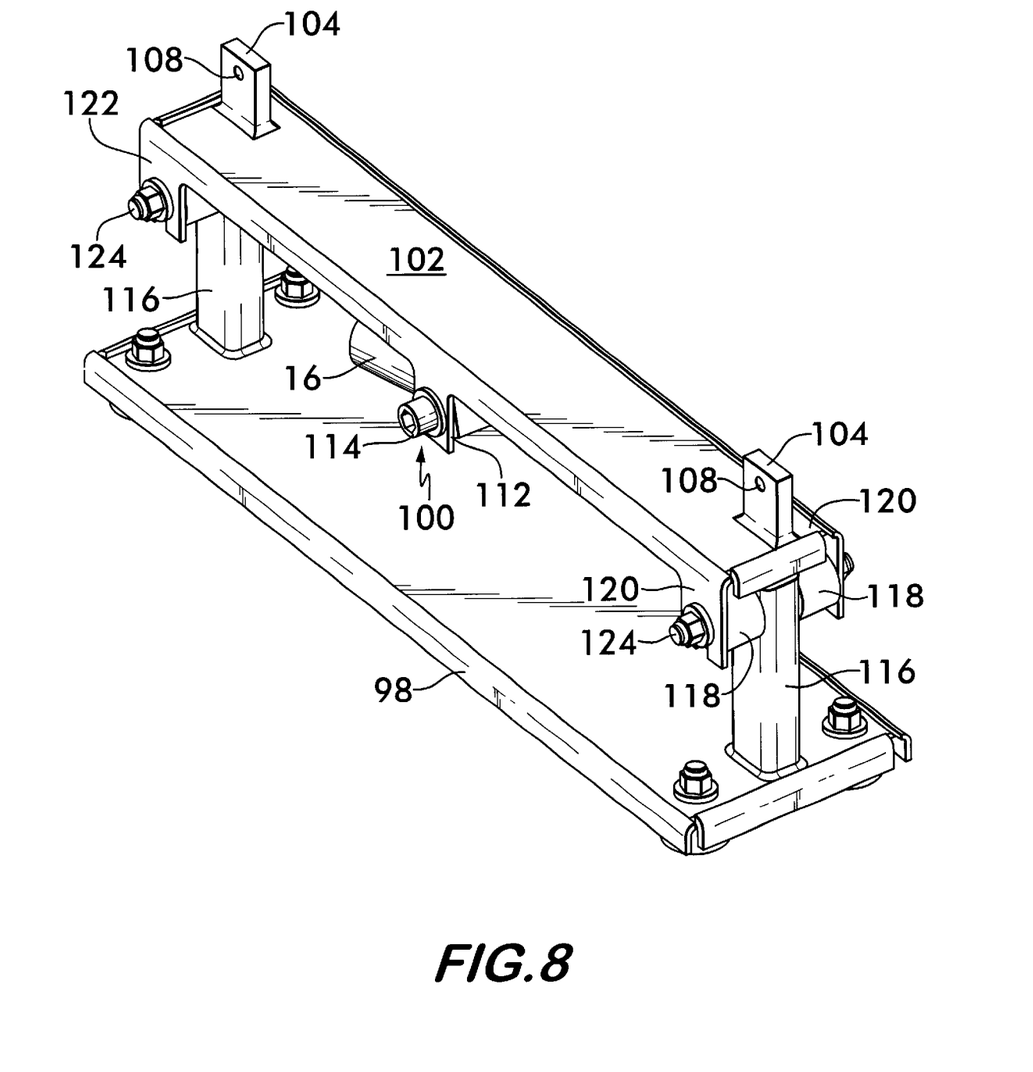
FIG. 8 is a perspective view of a portion of the preferred embodiment of FIG. 1.

The vibrator 16 can be mounted to the tray 14 in a variety of ways, one embodiment of which is depicted. In the embodiment shown and is best viewed in FIGS. 8–10, the vibrator 16 is mounted with a base plate 98, a vibrator mount 100, a feed rail 102 and a pair of mounting blocks 104. As shown in FIG. 8, the mounting blocks 104 extend from the feed rail 102. Extending from the tray 14, as shown in FIG. 6, are a pair of brackets 105. Brackets 105 have slots 106, which are shown in FIG. 6, and mounting blocks 104 have openings 108, as shown in FIG. 8. In order to mount the tray 14, the tray brackets 105 can be positioned proximate to the mounting blocks 104, and a fastener 110 can be inserted through the mounting block openings 108 and the bracket slots 106, as shown in FIGS. 1 and 10. The height of the tray 14 and the angle of the tray 14 can be adjusted by changing one or both of the positions of the tray bracket slots 106, which will be best understood be reviewing FIG. 10.

Figure 9:
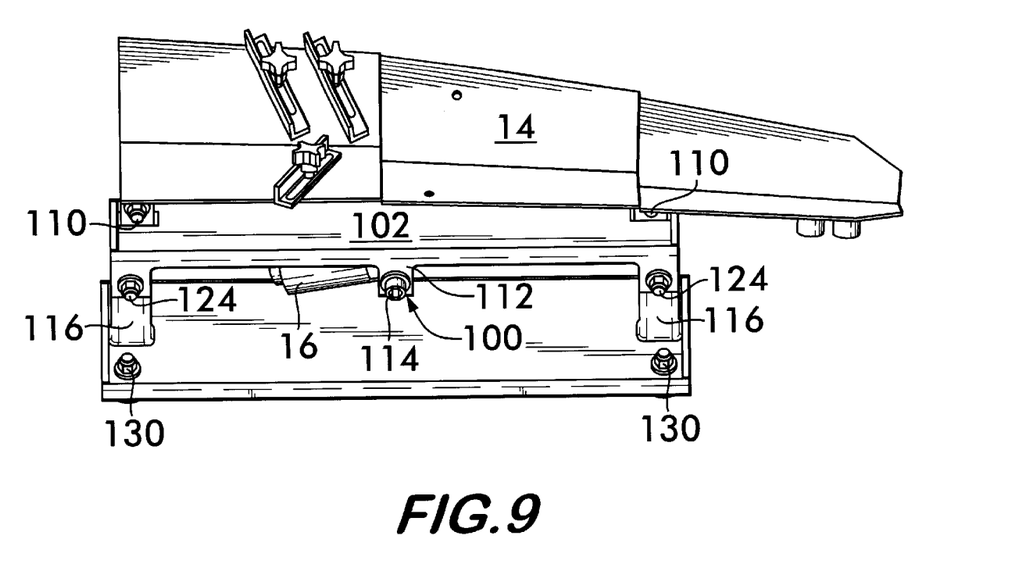
FIG. 9 is a perspective view of the tray and vibrator of FIG. 1.

Although the vibrator 16 can be mounted to the feed rail 102 in a variety of ways, the vibrator 16 is mounted to the feed rail 102 with an adjustable angle vibratory mount 100. This mount 100 includes in the preferred embodiment a feed rail bracket 112, and a fastener 114 as shown in FIGS. 8–10. The feed rail bracket 112 has openings (not shown) through which the fastener 114 extends as shown in FIGS. 8–10. Although not shown, it will also be appreciated that the fastener extends through a slot in the vibrator 16 in order to hold the vibrator 16 in place. Although only one side of the feed rail bracket 112 is shown in FIG. 8, it will be appreciated that the other side of the feed rail bracket 112 is similar in construction.

The angle at which the vibrator 16 is mounted can be adjusted by adjusting the position of the vibrator 16 with the fastener 114 in the vibratory mount 100. By adjusting the angle at which the vibrator 16 is mounted with respect to the vibratory mount 100, the vibrational characteristics of the tray 14 can be varied. For instance, the vibrator 16 produces a horizontal and a vertical vibrating force, which each have an amplitude. These amplitudes can be adjusted by varying the angle at which the vibrator 16 is mounted with respect to the feed rail 102. Adjusting the vibrator 16 to be either more or less horizontal will respectively increase or decrease the horizontal amplitude. Similarly, adjusting the vibrator 16 to more or less vertical will respectively increase or decrease the vertical amplitude.

As alluded to above, the vibrator 16 is preferably a pneumatic non-impacting linear vibrator. Being of the pneumatic type, pressurized air controls the operation of the vibrator 16. The higher the pressure of the compressed air used, the higher the frequency of vibration produced by the vibrator 16. Conversely, lowering the pressure of the compressed air, lowers the vibrator's frequency of vibration. The amplitude of vibration is controlled by the flow of compressed air through the vibrator 16. The greater the flow of air through the vibrator 16, the higher the vibrational amplitude, and the lower the flow of air, the lower the vibrational amplitude. It will be appreciated that the angle at which the vibrator 16 is mounted, the pressure of the compressed air and the flow of compressed air can all be adjusted based upon the size, shape and geometry of the components being fed and singulated.

The feed rail 102 may be mounted to the base plate 98 with columns 116, sandwich vibration mounts 118, feed rail brackets 120, 122 and fasteners 124, as shown in FIGS. 1 and 8–10. Columns 116 extend upward from the base plate 98 as shown in FIG. 8 and may be integrally formed with the base plate 98 or attached to the base plate 98. Each of the columns 116 may have a hole (although not shown it will be appreciated from FIG. 8 that the fasteners 124 extend into a hole in the columns) for receiving a pair of fasteners 124. The vibratory sandwich mounts 118 are rubber mounts for vibration isolation and can be made from a compounded elastomer which is preferably rubber or neoprene. As shown in FIG. 8, the fasteners 124 extend through slots 126 in the feed brackets 120, 122, through the mounts 118 and into the holes in the columns 116 in order to mount the feed rail 102 to the base plate 98. It will be appreciated that numerous other ways can be used to mount the feed rail 102.

The base plate 98 is mounted to the support plate 48 by any suitable means. In the preferred embodiment shown in FIG. 1, the base plate 98 is mounted to the support plate 48 with columns 128, fasteners 130, plate 132 and vibratory pads 134. The plate 132 is supported by columns 128 (three of the four are shown and it will be appreciated that there is a fourth column beneath the hopper 12 that is not visible in the view of FIG. 1) which are attached to the columns by any suitable means and may be integrally formed with the support plate 48. Fasteners 130 extend through holes in the base plate 98 and through the vibration pads 134, which are shown in FIG. 10. Fasteners 130 also attach the base plate 98 to the plate 132.

As shown in FIG. 1, the location of the attachment of the feed rail 102 to the vibrator 16 is preferably disposed to the rear of the hopper 12. It has been found through experimentation that certain components like fasteners (screws) flow better from the hopper 12 and along the tray when the attachment is behind the hopper 12 as opposed to forward of the hopper 12.

Operation of the Vibratory Feed System

Operation of the preferred embodiment of the feed system of this invention is best understood with reference to FIGS. 1, 2 and 4. Components are either continuously fed or placed as a batch into the top of the hopper 12. The components flow from the bottom of the hopper 12 to the first section 70 of the tray 14. The gate 38 limits the flow of components from the hopper 12. The vibrator vibrates the tray 14, which causes the components to flow along the first section 70 of the tray 14 and to the shedders 88. It will be appreciated that the components tend to flow out of the hopper 12 and to the first section 70 of the tray 14 in bunches, as opposed to a single file configuration. As the components flow along the path created by the shedders 88, the components may contact the shedders. This flow path and the contact with the shedders 88 causes the components to separate and as the components reach the exit the shedder path they are more singulated then when they entered the shedder path.

After flowing through the shedder path, the components try to align in the v-groove of the first tray section, which also assists in singulating the components 18. Once the end of the first tray section 70 is reached, the components 18 flow over the first step 81, as shown in FIG. 4. This waterfall type flow also assists in separating and singulating the components 18, as the components tend to separate as the components flow over the step. The components flowing through the second tray section 72 tend to flow in the v-groove which also assists in singulating the components 18. After flowing through the second tray section 72, the components 18 flow down the second step 82 and along the groove of the third tray section 74. The step and the v-grooves of the second and third tray sections 72, 74 once again assist in singulating the components, and at least by the end of the third tray section 74 the components 18 flow in a single file pattern. As described above, the third tray section 74 is preferably a cantilever and the vibration characteristics of the third tray section differ from that of the first two tray sections. This difference in vibration characteristics causes the components 18 to become separated and to flow in a single file pattern.

Depending upon the components 18 and their size, shape and geometry, the components 18 can be singulated after flowing through the first tray section. The shedders, the v-grooves, the steps and the vibration all tend to cause the components to become singulated. It will be appreciated that although one embodiment of the inventions has been described herein, there are numerous inventions described herein and all aspects of the different inventions are not necessary for other aspects of the inventions.

As mentioned above, the shedders can be configured in numerous ways. For example, the shedders made be rotated or moved laterally or a different number of shedders could be used. Moreover, shedders could be mounted on other places on the tray 14 including other tray sections. Additionally, the shedders could have a different geometry other than a flat surface to accommodate a component's size, shape or geometry. As also explained above, the v-groove can be sized based on the components' size, shape and geometry.

It will also be appreciated that the gate 38 and the shedders 88 regulate the flow of components 18 from the hopper to the first tray section 70. If too many components 18 tend to flow to the first tray section 70, the components 18 will tend to build up at the first shedder and where the hopper 12 empties to the first tray section 70. This causes a back pressure that limits the flow of components from the hopper 12 to the first tray section 70.

Second Preferred Embodiment

Figure 11:
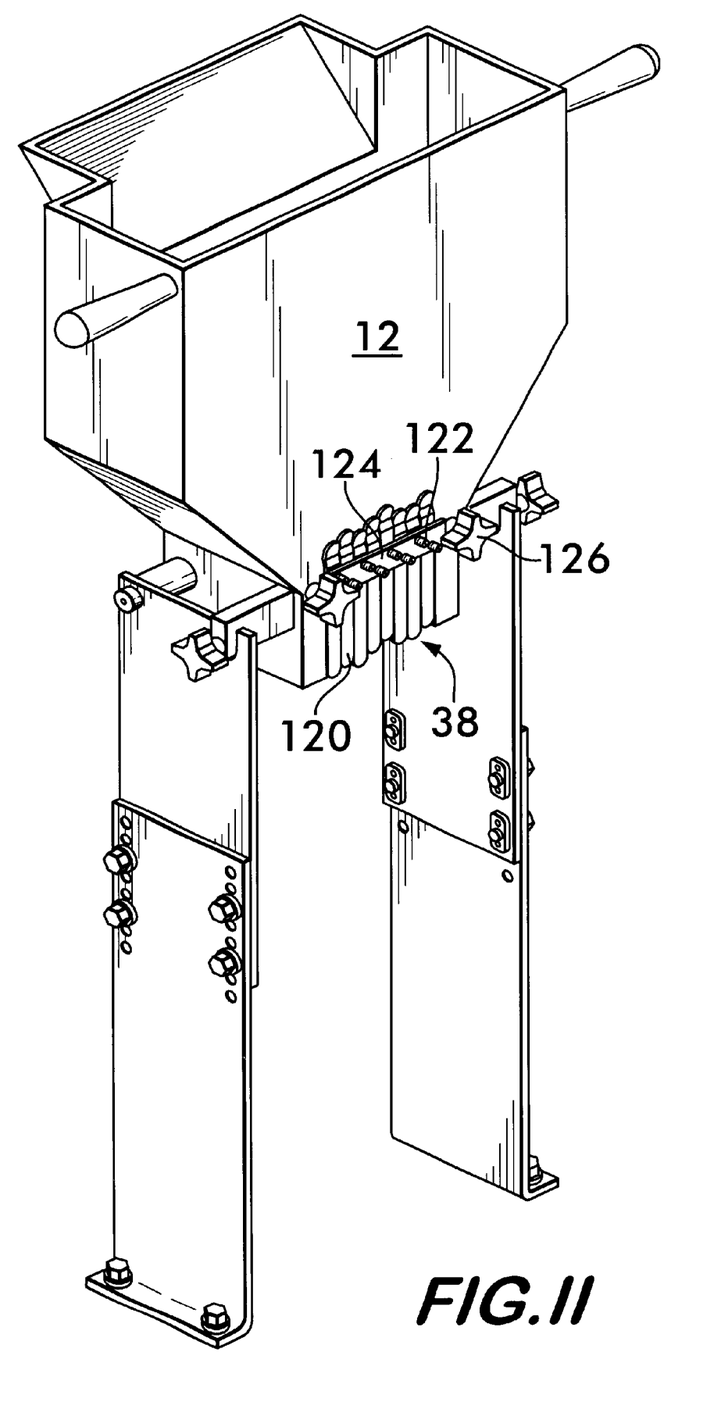
FIG. 11 is a perspective view of a second preferred embodiment of a hopper for use with the vibratory feed system of FIG. 1.

A second preferred embodiment of the invention is set forth in FIG. 11. In this embodiment, the gate 38 has a plurality of adjustable fingers 120. Each of the fingers 120 are individually adjustable with set screws 122. The fingers 120 can be adjusted by loosening the screws 122, raising or lowering the fingers 120 and tightening the screws 122. It will be appreciated that the hopper 12 may have threaded openings for receiving each of the screws 122. Each of the screws 122 can be mounted to bar 124 and inserted through holes in one of the fingers 120. The gate 38 can be mounted by fasteners 126 which extend through the bar 124 and through openings (not shown) in the hopper 12.

By changing the height of the fingers individually, the flow of components 18 from the hopper 12 can be regulated. Regulating the flow of components 18, helps to singulate the components 18 as they flow along the tray 14 because this regulation ensures that not too many components flow to the shedders 88 such that they could not be singulated.

Although certain features of the vibratory feed systems described herein relate to the singulation of components, it will be appreciated that certain aspects of the vibratory feed system 10 can be employed even if the components are not to be singulated. Moreover, various features of the feed systems described herein are beneficial in feeding components that need not be singulated. For example, if the device 20 fed by the vibratory feed system 10 is a weight counting machine, the components could be fed to the device 20 in bunches rather than one at a time. It will be appreciated that the improved vibratory feed system 10 could be adapted to change the flow of components to for example two or three or more at a time.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A vibratory feeding system for feeding a plurality of components, comprising:
    a tray for receiving a plurality of components, the tray comprising
        a first inclined section comprising a groove;
        a second inclined section comprising a groove and being mounted to the first section so that there is a step between the first section and the second section; and
    a vibrator coupled to the tray, the vibrator providing the impetus to vibrate the first and section tray sections so that the plurality of components flow along the groove of the first inclined tray section, down the step and along the groove of the second inclined second tray section.

2. The vibratory feeding system of claim 1, wherein the second tray section is mounted as a cantilever so that the vibratory characteristics of the first and the second tray sections differ.

3. The vibratory feeding system of claim 1, further comprising a plurality of shedders mounted to the tray that define a path for the plurality of components to flow along the tray.

4. The vibratory feeding system of claim 1, further comprising at least one shedder mounted on the tray that defines a path for the plurality of components to flow along the tray.

5. The vibratory feeding system of claim 4, wherein the at least one shedder is relatively rigid.

6. The vibratory feeding system of claim 1, wherein the groove of the first and the second tray sections comprises a substantially v-shaped groove.

7. The vibratory feeding system of claim 6, wherein the substantially v-shaped groove of the first section is flatter than the substantially v-shaped groove of the second section.

8. The vibratory feeding system of claim 1, wherein the tray further comprises a third tray section.

9. The vibratory feeding system of claim 8, wherein the third tray section comprises a substantially v-shaped groove, the grooves of the first and the second tray sections are substantially v-shaped, the substantially v-shaped groove of the first tray section is flatter than the substantially v-shaped of the second section and the substantially v-shaped groove of the second tray section is flatter than the substantially v-shaped groove of the third section.

10. The vibratory feeding system of claim 1, further comprising a hopper for holding a plurality of components disposed above the tray so that the plurality of components can flow from the hopper to the first section of the tray.

11. The vibratory feeding system of claim 10, further comprising a gate mounted to the hopper that regulates the flow of components from the hopper to the tray.

12. The vibratory feeding system of claim 11, wherein the gate comprises at least one member which is adjustably mounted so that an opening defined by the gate through which components flow to the tray can be adjusted based on the components.

13. The vibratory feeding system of claim 12, wherein the at least one member of the gate comprises a plurality of members that are each adjustably mounted.

14. A vibratory feed system, comprising:
    a hopper for holding a plurality of components;
    a tray disposed beneath the hopper so that the plurality of components can flow from the hopper to the tray;
    a plurality of relatively rigid shedders that are adjustably mounted to the tray so that the shedders extend at an angle to a longitudinal axis of the tray and so that the angle at which the shedders are disposed can be adjusted, the plurality of components contacting and bouncing off of the plurality of shedders as the plurality of components flow along the tray and thereby causing the plurality of components to separate from each other; and
    a vibrator mounted to the tray, the vibrator providing the impetus to vibrate the tray so that the plurality of components are fed along the inclined tray.

15. The vibratory feeding system of claim 14, wherein the plurality of shedders are mounted to the tray proximate to where the hopper is disposed above the tray.

16. The vibratory feed system of claim 14, wherein the plurality of shedders are adjustably mounted to the tray.

17. The vibratory feed system of claim 14, wherein the plurality of shedders are adjustably mounted to the tray so that the distance that the shedders extend laterally across the tray can be adjusted.

18. The vibratory feeding system of claim 14, wherein the tray comprises a first inclined section, a second inclined section and a step between the first and the second inclined sections.

19. The vibratory feeding system of claim 18, wherein the first and the second inclined tray sections each comprises a v-groove.

20. The vibratory feed system of claim 18, wherein the tray further comprises a third inclined section mounted to the second inclined section so that there is a step between the second and third inclined sections.

21. The vibratory feeding system of claim 20, wherein the third tray section comprises a groove which is substantially v-shaped.

22. The vibratory feeding system of claim 20, wherein the third tray section is mounted as a cantilever so that the vibratory characteristics of the third tray section differ from that of the first two tray sections.

23. The vibratory feeding system of claim 20, wherein the first, the second and the third tray sections each comprise a groove which is substantially v-shaped and the substantially v-shaped groove of the first tray section is flatter than the substantially v-shaped of the second section and the substantially v-shaped groove of the second tray section is flatter than the substantially v-shaped groove of the third section.

24. A vibratory feeding system, comprising:
    a hopper for holding a plurality of components;
    a tray disposed beneath the hopper so that the plurality of components can flow from the hopper to the tray, the tray comprising
        a first inclined section comprising a groove;
        a second inclined section comprising a groove mounted to the first inclined section, so that there is a first step between the first section and the second section;

a third inclined section comprising a groove mounted to the second inclined section so that there is a second step between the second and the third inclined sections;

a vibrator mounted to the first and the second inclined tray sections the vibrator providing the impetus to vibrate the first and section tray sections so that the plurality of components flow down the incline of the first tray section down the first step, down the inclined second section, down the second step and down the inclined third tray section.

25. The vibratory feeding system of claim 24, further comprising at least one shedder mounted to the tray.

26. The vibratory feeding system of claim 24, wherein the grooves of the first, the second and the third inclined tray sections comprise substantially v-shaped grooves.

27. The vibratory feeding system of claim 24, further comprising a gate disposed between the hopper and the first tray section.

28. The vibratory feeding system of claim 24, wherein the third tray section is mounted as a cantilever so that the vibratory characteristics of the third tray section differ from that of the first two tray sections.

29. The vibratory feeding system of claim 24, further comprising a plurality of shedders mounted to the tray that define a path through which the plurality of components flow.

30. The vibratory feeding system of claim 25, wherein the at least one shedder is rigidly mounted to the tray so that the at least one shedder does not flex when components contact the shedder.

31. The vibratory feeding system of claim 25, wherein the at least one shedder is adjustably mounted to the tray.

32. A vibratory feed system, comprising:

a hopper for holding a plurality of components;

a tray which defines at least in part a downwardly inclined path which extends from a receiving location to a discharge location, the hopper being disposed above the receiving location so that the plurality of components flow from the hopper to the tray receiving location;

a plurality of shedders mounted to the tray proximal to the receiving location to define a serpentine path, so that the plurality of components flow from the receiving location and between the plurality of shedders, the plurality of shedders creating a back pressure as the flow of plurality of components increases from the hopper to the tray receiving location, the back pressure limiting the flow of the plurality of components from the hopper to the tray receiving location; and a vibrator mounted to the tray, the vibrator providing the impetus to vibrate the tray so that the plurality of components are fed along the inclined tray.

33. The vibratory feed system of claim 32, wherein the tray further comprises a plurality of tray sections which are each connected by a step over which the plurality of components flow.

34. The vibratory feed system of claim 32, wherein the plurality of tray sections each comprise a substantially v-shaped groove.

* * * * *